United States Patent [19]

Lundgren

[11] Patent Number: 4,596,477

[45] Date of Patent: Jun. 24, 1986

[54] DEVICE FOR FASTENING A MACHINE ELEMENT

[75] Inventor: Bengt Lundgren, Lerum, Sweden

[73] Assignee: SKF Nova AB, Goteborg, Sweden

[21] Appl. No.: 696,436

[22] Filed: Jan. 30, 1985

[51] Int. Cl.⁴ ............................................. F16C 43/04
[52] U.S. Cl. ................................... 384/538; 384/562
[58] Field of Search .............. 384/537, 538, 540, 541, 384/542, 562

[56] References Cited

U.S. PATENT DOCUMENTS

| | | | |
|---|---|---|---|
| 1,026,463 | 5/1912 | Schneider | 384/538 X |
| 1,116,845 | 11/1914 | Rogers | 384/538 |
| 1,380,708 | 6/1921 | Ford | 384/538 |
| 3,301,614 | 1/1967 | Haentjens | 384/472 |
| 3,816,013 | 6/1974 | Schuhmann | 384/538 X |
| 4,012,154 | 3/1977 | Durwin et al. | 384/542 X |
| 4,343,565 | 8/1982 | Hallerbäck | 384/538 X |

Primary Examiner—Stuart S. Levy
Assistant Examiner—Thomas R. Hannon
Attorney, Agent, or Firm—Eugene E. Renz, Jr.

[57] ABSTRACT

A device for fastening e.g. a bearing ring on a shaft comprises a clamping sleeve and a clamping member co-operating with the sleeve. The clamping member and the sleeve contact each other over wedge-shaped surfaces. The sleeve surfaces intended for contacting the bearing ring and the clamping member have such shape that the clamping force acts essentially on that part of the sleeve which co-operates with the clamping member, and no appreciable axial displacement takes place between the sleeve and the bearing ring. Thereby the bearing ring keeps its shape and position during mounting.

6 Claims, 6 Drawing Figures

4,596,477

DEVICE FOR FASTENING A MACHINE ELEMENT

FIELD OF THE INVENTION

The present invention relates to a device for fastening a first machine element to the annular surface of the second machine element by means of a clamping sleeve arrangement wherein the radial clamping force is exerted only in the area outboard of the bearing to be secured.

BACKGROUND OF THE INVENTION

Such devices are known by e.g. the Swedish patent publication 7909531-1, and are commonly used for affixing e.g. bearings to shafts. A clamping force is thereby established by axial displacement of the inner ring of the bearing, or of a sleeve arranged therein, the sleeve or the ring having a tapered bore, along a sleeve which has a corresponding tapered outer surface. The bearing ring is thereby clamped against the sleeve, which is simultaneously clamped against the shaft. The axial displacement is usually brought about by tightening a nut or a number of screws against an end plane of the ring.

Devices of this kind have some disadvantages. For example, the bearing ring is moved axially in relation to the shaft during the clamping procedure, whereby the position of the bearing, when mounted to the shaft, is indetermined. Further, the internal play of the bearing is changed during the clamping procedure, which causes a temperature rise in the bearing in operation and also impairs the bearing characteristics in other respects.

The purpose of the present invention is to provide a device of the kind stated in the introduction in which device the disadvantages mentioned above are avoided. To this end and in accordance with the present invention, a clamping sleeve is provided having a first portion confronting and disposed between a first machine element and the annular surface of a second machine element. An annular member, concentric and movable in relation to the second sleeve portion, is provided which cooperates with wedge-shaped profiles on the second sleeve portion to exert an axial force between the first machine element and the annular member to thereby clamp the machine element on the sleeve. The confronting surfaces of the first machine element and the first sleeve portion are of a predetermined configuration so that no appreciable axial displacement occurs between the clamping sleeve and the first machine element when axial force is exerted and no appreciable seating force is exerted between the confronting surfaces. Accordingly, in utilizing the present invention to mount bearings on a shaft member or the like the radial clamping force is applied outboard of the bearing and this does not influence play or preload in the bearing.

Fastening and unfastening can be brought about very easily with such a device, and the machine elements to be fastened need not be specially designed.

BRIEF DESCRIPTION OF THE DRAWINGS

The following is a detailed description of the invention with reference to the accompanying drawings, in which.

DESCRIPTION OF THE PREFERRED EMBODIMENTS

Figure 1:
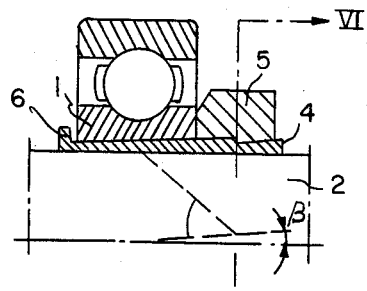
FIGS. 1-5 show axial sections of devices according to different embodiments of the invention for fastening bearings to shafts and in bores.
Figure 2:
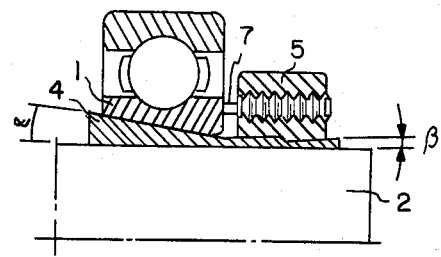
Figure 3:
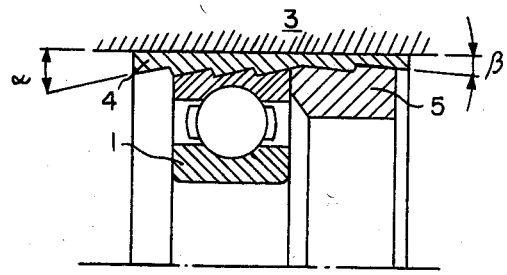

A machine element, here exemplified by a bearing 1, is fixed to a shaft 2 (FIGS. 1,2,4,5) or in a bore in a surrounding element (FIG. 3). The fastening device comprises a clamping sleeve 4 which is enclosed by, or encloses, the machine element 1. An annular member 5 is arranged around the sleeve 4 and can be displaced on it so that the sleeve is clamped radially. An end surface of the machine element 1 takes up an axial force which is exerted during the clamping procedure. According to the invention, the surface portions of the sleeve and the annular member 5 which are intended for contacting each other have wedge-shaped profiles, and corresponding surface portions of the sleeve and the machine element have such a shape that no appreciable relative displacement occurs between the sleeve and the machine element when said axial force is exerted.

This can be achieved in many different ways. According to the embodiment of FIG. 1, the sleeve 4 is provided with a radial flange 6 intended to abut the machine element 1 and take up axial forces which are exerted to the machine element when the member 5 is made to move in relation to the sleeve. The sleeve 4 may have a cylindrical portion on which the machine element 1 can be placed, and the member 5 can be a nut with a threaded bore arranged on a corresponding threaded portion of the sleeve 4, the thread suitably having a great pitch, e.g. 0.5-1 times the axial extension of the nut, one of the thread flanks defining a relatively small angle $\beta$ with the sleeve axis. When the nut 5 is turned, it is pressed axially against the machine element 1, which is kept in position on the sleeve by being squeezed between the flange 6 and the nut. When the nut is further turned after having contacted the machine element 1, which in its turn abuts the flange 6, it is not displaced axially on the sleeve 4, but the thread flanks act as mainly circular wedges, so that the sleeve is clamped radially under the nut and is fixed with a friction force to the shaft 2, whereas no such radial clamping takes place under machine element 1, which thus is not radially deformed but keeps its shape, which is important if the element is e.g. a rolling bearing ring, as mentioned above. A further description of the clamping procedure is made below in connection to FIG. 6.

FIG. 2 shows how the machine element 1 can be kept in position on the sleeve 4 by the fact that the bore of the machine element 1 and the surface portions of the sleeve 4 intended for contacting the machine element have wedge-shaped axial section profiles, the wedge angle $\alpha$ thereby being greater than the wedge angle $\beta$ of the surface portion of the sleeve 4 which contacts the annular member 5. The portion which defines the angle $\alpha$ is a conical portion, and the portion which defines the angle $\beta$ can be designed according to FIG. 1 or be a plurality of conical portions arranged in sequence, on which portions is arranged an annular member 5 with a corresponding bore. A number of axial screws 7 arranged in threaded bores in the annular member 5 and abutting machine element 1 are used for bringing about the displacement required for squeezing the member 5 upon the cones with the angle $\beta$, thereby fixing the sleeve 4 to the shaft 2. The machine element 1 is fixed by the reactive force from the screws 7 against the conical portion with the angle $\alpha$ on the sleeve, whereby, because of the fact that the angle α is relatively great, no great radial force component is obtained in the contact between the machine element 1 and the sleeve 4, and no appreciable axial displacement of the machine element 1 on the sleeve 4 occurs.

FIG. 3 shows an embodiment of the invention in the shape of a device for fastening an outer ring of a rolling bearing in a bore of a surrounding element 3, e.g. a bearing housing. The wedge portions of the sleeve 4 are herewith situated in the bore of the sleeve. The member 5 can be a nut with an external thread with a saw tooth profile having a wedge angle β corresponding to the embodiment of FIG. 1, whereas the envelope surface of the outer ring of the bearing 1 can be provided with a thread with a saw tooth profile having a wedge angle α, or have a number of conical portions with a cone angle 2 α, the sleeve 4 having a corresponding shape.

Figure 4:
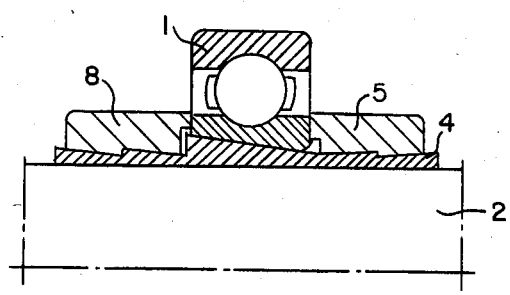

FIG. 4 shows a device for fastening a machine element 1 to a shaft 2, in which device the machine element 1 has a conical bore arranged on a corresponding conical seat on a sleeve 4. Fastening can be carried out by squeezing the machine element 1 on to the cone by tightening a nut 5 corresponding to the nut 5 of FIG. 1. In order to dismount the joint, the sleeve may be provided with a threaded portion adjacent the large end of the conical portion which is enclosed by machine element 1, a second nut 8 corresponding to nut 5 being provided on this threaded portion. This nut 8 can be used for enhancing the clamping force of the sleeve 4 against a shaft if the nut is tightened against the machine element 1 after the machine element 1 has been secured to the enclosed cone by the nut 5, whereby both nuts are used for clamping the sleeve without the machine element 1 being moved axially in relation to the sleeve 4.

The nuts 5 and 8 can be hydraulic nuts, known per se, comprising an axially movable annular piston, the nut threads being modified according to what has been described with reference to FIG. 1.

Figure 5:
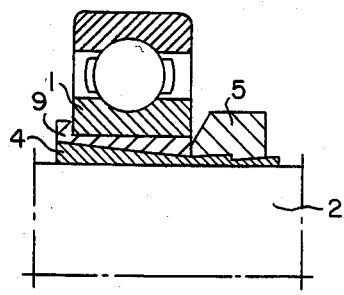

FIG. 5 shows that also double clamping sleeves 4, 9 can be used in the present invention. This gives the advantage that the machine element 1 can have a cylindrical bore but still can be clamped radially to a press fit. The machine element 1 may thereby be a standard ball bearing.

Figure 6:
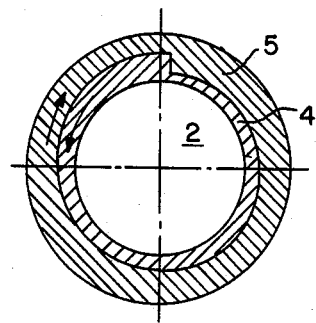
FIG. 6 shows a cross section in the plane VI—VI in FIG. 1.

FIG. 6 shows a section perpendicular to the axis of the sleeve thread according to FIG. 1. When the nut 5 is turned without axial motion on the cooperating thread, the thread flank of the nut will climb tangentially up the circular wedge defined by the thread flank profile of the sleeve 4 in the cross section of FIG. 6, the wedge angle of which being much smaller than the flank angle of the thread in an axial section. If the flank angle in the axial section corresponds to a conicity of 1:12, which is common for tapered clamping sleeves for fastening of rolling bearings, then the wedge angle of the circular wedge, when evoluted in a plane, provided the thread pitch is 10 mm, is such that it corresponds to a conicity of 1:100–1:400 for the most common bearing sizes. This means that, in devices such as the one shown in e.g. FIG. 5, considerable wedging forces against the shaft are obtained under the nut already when a moderate torque is applied to the nut, and that the axial motion of the bearing inner ring is comparatively small because a comparatively small axial force is exerted and the clamping sleeve has a comparatively great cone angle under the bearing 1. The shape of the cross section of the sleeve threads as shown in FIG. 6 entails that the nut 5 will get a slightly oval shape when tightened, and the nut will thus act as a radially resilient spring. Because of the very small wedge angle of the circular wedge and the resiliency of the oval nut, the nut is self-locking and does not have to be secured by locking washers, which constitutes another advantage of the described system.

The clamping surfaces the profiles of which are shown in FIG. 6 may possibly be cylindrical, i.e. they may not necessarily have a thread shape, whereby no axial movement of the member 5 takes place when the member is turned on the sleeve. The sleeve is thereby only clamped radially because of the spiral shape of the cross section of the clamping surfaces. Axial forces can thereby be brought about by means of axially directed screws, as shown in FIG. 2.

What is claimed is:

1. A device for fastening a first machine element to the annular surface of a second machine element, comprising a clamping sleeve having a first portion confronting and disposed between the first machine element and the annular surface and a second sleeve portion outboard thereof, an annular member concentric and movable relative to said second sleeve portion and engageable with said first machine element and cooperable with wedge-shaped profiles on said second sleeve portion to exert a seating force to secure said sleeve member to said second machine element, the confronting surfaces of said first machine element and said first sleeve portion being of a predetermined configuration so that no appreciable axial displacement occurs between said clamping sleeve and said first machine element when said axial force is exerted and no appreciable seating force is exerted between said confronting surfaces.

2. A device according to claim 1, in which the member (5) is a nut arranged on a threaded portion of the sleeve (4), the thread having a great pitch, one thread flank having a small flange angle (β), the nut contacting the machine element (1) when being tightened for causing clamping.

3. A device according to claim 1, in which the surface portion of the sleeve (4) intended for contacting the machine element (1) have wedge-shaped axial section profiles, the wedge angle (α) of the surface portion contacting the machine element (1) being greater than the wedge angle (β) of the surface portions of the sleeve which contact the member (5).

4. A device according to claim 1, in which the sleeve is provided with a radial flange (6) intended for contacting the machine element (1) and taking up axial force acting on the element when the axial force between the machine element (1) and the member (5) is exerted.

5. A device according to claim 4, in which the sleeve (4) has a cylindrical portion on or in which the machine element (1) is intended to be placed.

6. A device according to claim 1, in which the machine element (1) is arranged on a conical seat on the sleeve and a nut (8) is arranged on a threaded portion adjacent the large end of the cone of the sleeve, the thread of the nut (8) and the sleeve (4) having a great pitch and a small flank angle.

* * * * *